G. M. LITTLE.
ARC LAMP.
APPLICATION FILED OCT. 3, 1913.

1,259,420.

Patented Mar. 12, 1918.

WITNESSES:
Fred A. Lind.
Geo. W. Hansen.

INVENTOR
George M. Little
BY
Wesley G. Carr
ATTORNEY

UNITED STATES PATENT OFFICE.

GEORGE M. LITTLE, OF PITTSBURGH, PENNSYLVANIA, ASSIGNOR TO WESTINGHOUSE ELECTRIC AND MANUFACTURING COMPANY, A CORPORATION OF PENNSYLVANIA.

ARC-LAMP.

1,259,420.   Specification of Letters Patent.   Patented Mar. 12, 1918.

Application filed October 3, 1913. Serial No. 793,112.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Arc-Lamps, of which the following is a specification.

My invention relates to arc lamps, and it has reference to those commonly known as flaming and luminous arc lamps in which the electrodes, on being consumed in the arc, yield fumes and vapors.

More particularly, my invention relates to improvements in condensing chambers, whereby a defined circulating system for the arc gases may be developed which will coöperate to increase the stability of the arc.

In an arc lamp, the arc established between the coöperating electrodes is subjected to forces resulting from improperly directed air currents, magnetic fields, movements and presence of solid obstructions, etc., which tend to change the arc from normal to abnormal shape by deflection often causing a rupture of the arc. It is well known that a draft of air properly directed to oppose the elongation of the arc will increase its stability.

In inclosed flaming arc lamps, it is inadvisable to admit atmospheric air during the operation of the lamp, and, consequently, condensers must be employed wherein the fumes and vapors containing suspended matter or soot may condense and deposit before being returned to the arc chamber.

One object of my invention is to provide, in a focusing arc lamp of the character above indicated, a means whereby a definite circulation of the arc gases may be effected for increasing the stability of the arc and, at the same time, permit the arc gases, on being generated at the arc, to flow freely into the condenser and deposit therein suspended matter before being returned to the arc chamber.

Without attempting to illustrate the various forms that my invention may assume, I will describe a specific embodiment of the principle of my invention as applied to a common form of an arc lamp, but those skilled in the art will readily understand that my invention is not limited to the specific structural details disclosed herein.

Figure 1:
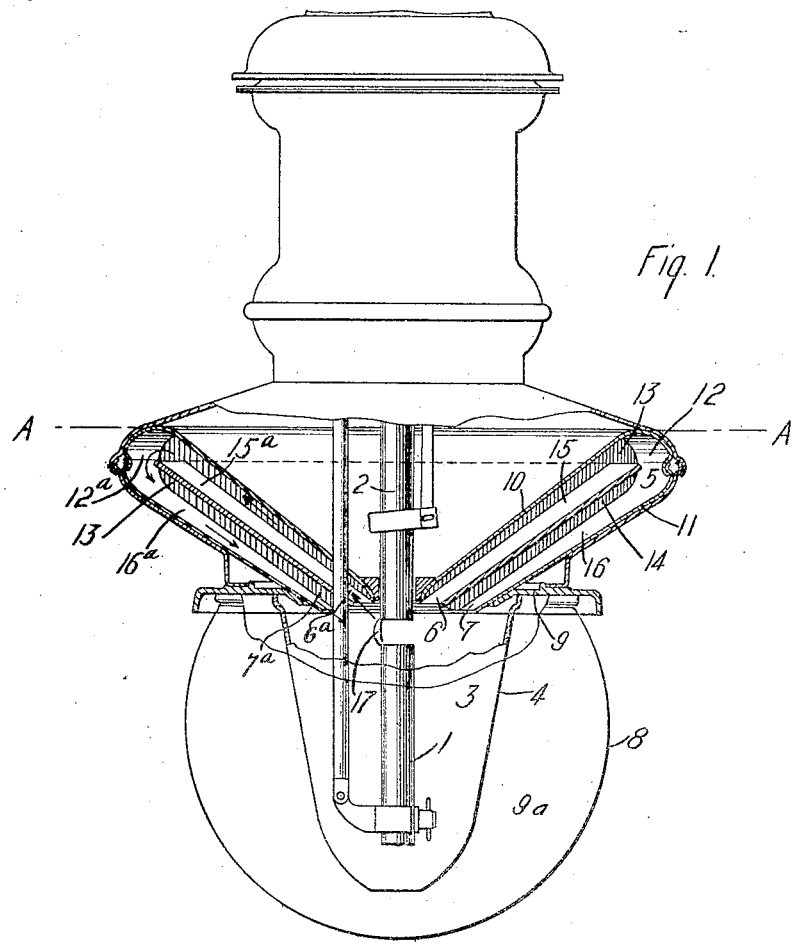
Figure 2:
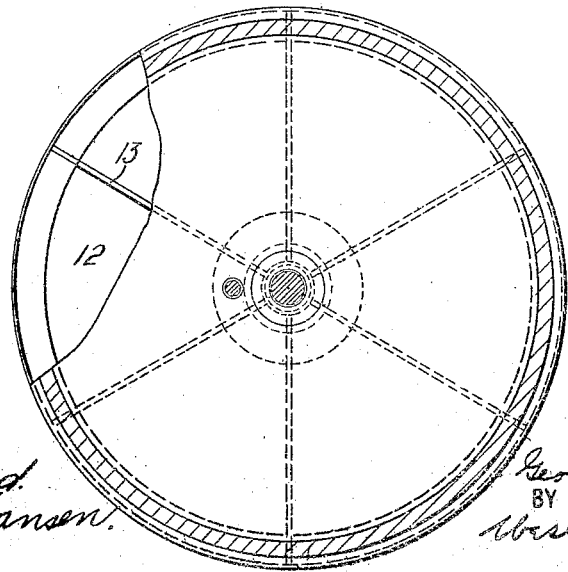

In the accompanying drawing, Figure 1 is a view, partially in elevation and partially in section, of an inclosed arc lamp that is constructed in accordance with my invention, and Fig. 2 is a sectional plan view, taken along the line A—A of Fig. 1 in which a portion of the structure has been broken away.

The arc, which extends between adjacent and opposite ends of a lower electrode 1 and an upper electrode 2, is contained in an arc chamber 3 provided by an inclosing globe 4. The globe 4 is closed at the bottom and registers at the top with a condenser 5 which is positioned above the arc chamber 3. Communication between the arc chamber 3 and the condenser 5, which are closed to preclude the admission of atmospheric air thereto, is afforded by inner and outer annular passage-ways 6 and 7, respectively. An outer globe 8, substantially inclosing the inner globe 4 and cut off from communication with the condenser 6 by means of an imperforate ring 9, provides a dead air space $9^a$ by means of which the inner surface of the globe 4 is maintained substantially uniformly hot during the operation of the lamp, thereby precluding the deposition thereon of vapors emanating from the arc.

The condenser 5 extends between adjacent and opposite surfaces of an upper wall 10 and a lower wall 11, each made from spun metal and having the contour of an inverted conical frustum. The outer edges of the metal walls 11 and 10 are reversely curved and secured to one another substantially as shown in Fig. 1. The walls 10 and 11 laterally extending beyond the widest part of the globe 4, enhance the heat-dissipating property of the condenser 5 by reason of a considerable portion of the condenser being removed from the lines of heat radiation from the arc chamber 3. The condenser 5 is sub-divided into a plurality of similar and non-intercommunicating chambers 12 by spaced and radial partitions 13, as shown in Fig. 2. Positioned within each of the chambers 12 and spaced substantially equidistant from and parallel to the inclosing walls 10 and 11 is a division device 14 of sheet material, which is secured in any well known manner to the partitions 13. The division device 14 coöperates to provide the annular openings 6 and 7 and also divides the chambers 12 into channels 15 and 16 which communicate with one another near the outer boundary of the said chamber, substantially as shown in the figure.

As the electrodes 1 and 2 are consumed, the arc frequently becomes elongated and takes an undesirable bent or bowed position by reason of the disturbing forces acting upon the arc. Unless the disturbing force or forces are neutralized, the arc, being distorted from its normal shape, will be elongated until it becomes ruptured. Assuming that the arc temporarily takes the position indicated at 17 in Fig. 1, which position is one of many that the arc may occupy and which shows it elongated by reason of the action of some disturbing force, the heated fumes and vapors emitted therefrom will tend to flow upwardly from the arc chamber 3 into that comparatively cool compartment 12ª which is positioned above and adjacent to the arc when in this position, the said upwardly flowing gases carrying with them the soot and finely divided dust projected from the electrodes during their consumption. The hot gases passing freely through the opening 6ª which is located in their path of flow, will be directed into the proper compartment 12ª and upwardly by means of the channel 15ª and then downwardly through the channel 16ª. The channel 16ª discharges the gases into the arc chamber and directs them in proximity to the arc 17. As the gases flow through the said channels, they are brought into intimate contact with the cool walls 10, 11, 13 and 14 upon which the suspended material is deposited. The cleansed gases, flowing from the compartment 12ª which is positioned directly above the arc 17 and through the annular opening 7ª, into the arc chamber 3, create a downward draft which tends to force the arc toward the center and away from the sides of the electrodes, thereby increasing its stability. As the arc moves around, the different compartments 12 are called in to play, and the arc finds no side position in which it can remain. The direction of flow of the gases which are emitted from the arc 17 is indicated in Fig. 1 by arrows.

It is desirable that, as the gases emerge from the channels 16, they have a considerable velocity imparted to them. This is effected by properly proportioning the size of the channels 16 and that of the openings 7. In the device shown, I have so shaped the channel 16ª that the gases are properly directed before emerging into the arc chamber for creating the desired horizontally and centrally directed draft of air. Of course, if the arc is burning in or near the center of the arcing ends of the electrodes, all the compartments will act simultaneously and will neutralize the side drafts.

From the foregoing, it is apparent that the focusing type lamp is so constructed as to be provided with an effective condenser, in addition to means for creating a draft of air at substantially right angles to the arc and in proximity thereto, whereby the arc is made more stable, which results in making the operation of the lamp more satisfactory.

It will, of course, be understood that the device herein shown and described is only illustrative of means for accomplishing a specific purpose, and that the details of construction and the arrangement and location of parts may be materially varied from what is herein set forth without departing from the spirit and scope of my invention.

I claim as my invention:

1. In an arc lamp, the combination with electrodes, of a condensing chamber having means for so segregating and directing the cool gases from the arc that the gases are directed at points on the periphery of the arc in accordance with the position thereof.

2. In an arc lamp, the combination with electrodes, of a condensing chamber having means for so segregating and directing the cool gases from the arc that the gases are directed at points on the surface of the arc in accordance with fluctuations of the same.

3. In an arc lamp, the combination with electrodes, of a condensing chamber having selective means for segregating and directing from all sides of the arc the arc gases in a manner to stabilize the arc.

4. In an arc lamp, the combination with electrodes, of a condensing chamber having means for dividing the arc gases into a plurality of separate drafts and directing them each from a position above the arc toward a point within the same, the said drafts forming a system of separate radial forces tending to center the arc.

5. In an arc lamp, the combination with electrodes, of a condensing chamber having means for dividing the arc gases into a plurality of separate drafts and directing them each from a position above the arc toward a point within the same, the said means being also adapted to selectively vary the strength of the several drafs in accordance with fluctuations in the arc.

6. In an arc lamp, the combination with electrodes, of a condensing chamber having means for dividing the arc gases into a plurality of separate drafts and directing them each from a position above the arc toward a point within the same to stabilize the arc.

7. In an arc lamp, the combination with electrodes, of a condensing chamber having means for dividing the arc gases into a plurality of separate drafts and directing them each from a position above the arc toward a point within the same, the said means being also adapted to vary the strength of the several drafts in accordance with the degree of departure of the arc from its position with respect to the electrode.

8. In an arc lamp, the combination with electrodes, of a condensing chamber comprising two concentric walls joined at their outer perimeter and disposed in a position above the arc, a partition member positioned intermediate the condenser walls and extending from a position adjacent the inner and open perimeter of the condensing chamber to a position within and near the outer joinder of the condenser walls and a plurality of vertical and radial partition members within the condensing chamber, the said radial partition members being adapted in conjunction with the aforesaid partition member to divide the condenser chamber into compartments for the convection of arc gases toward the arc to surround it with stabilizing drafts.

In testimony whereof, I have hereunto subscribed my name this 26th day of Sept., 1913.

GEORGE M. LITTLE.

Witnesses:
B. B. HINES,
M. C. MERZ.

Copies of this patent may be obtained for five cents each, by addressing the "Commissioner of Patents, Washington, D. C."